United States Patent
Hoshi

(10) Patent No.: US 8,671,568 B2
(45) Date of Patent: Mar. 18, 2014

(54) METHOD OF INSTALLING EQUIPMENT INTO A PIT CONTAINER USING AN ANCHOR MEMBER SUPPORTING MECHANISM AND AN ANCHOR BOLT UNIT

(75) Inventor: Isao Hoshi, Yokohama (JP)

(73) Assignee: Toshiba Plant Systems & Services Corporation, Yokohama-shi, Kanagawa (JP)

( * ) Notice: Subject to any disclaimer, the term of this patent is extended or adjusted under 35 U.S.C. 154(b) by 578 days.

(21) Appl. No.: 13/059,532

(22) PCT Filed: Aug. 20, 2009

(86) PCT No.: PCT/JP2009/064543
§ 371 (c)(1),
(2), (4) Date: Feb. 17, 2011

(87) PCT Pub. No.: WO2010/021352
PCT Pub. Date: Feb. 25, 2010

(65) Prior Publication Data
US 2011/0154644 A1 Jun. 30, 2011

(30) Foreign Application Priority Data

Aug. 22, 2008 (JP) .............................. P2008-214389

(51) Int. Cl.
*G21C 9/00* (2006.01)
*G21C 9/016* (2006.01)
(52) U.S. Cl.
USPC ...................... 29/888.021; 29/897.3; 376/293
(58) Field of Classification Search
USPC ............. 29/888.02, 888.021, 897.3; 376/280, 376/287, 293; 52/295
See application file for complete search history.

(56) References Cited

U.S. PATENT DOCUMENTS 2,983,659 A * 5/1961 Treshow ....................... 376/272
3,755,079 A * 8/1973 Weinstein et al. ............ 376/293
(Continued)

FOREIGN PATENT DOCUMENTS

| JP | 2-217521 | 8/1990 |
| JP | 2002-147392 | 5/2002 |
| JP | 2004-309406 | 11/2004 |

OTHER PUBLICATIONS

International Search Report from Japanese Patent Office for International Application No. PCT/JP2009/064543, Mailed Oct. 13, 2009.

(Continued)

*Primary Examiner* — David Bryant
*Assistant Examiner* — Jason L Vaughan
(74) *Attorney, Agent, or Firm* — Finnegan, Henderson, Farabow, Garrett & Dunner, L.L.P.

(57) ABSTRACT

Efficiency of installation work of equipment such as an ECCS pump is enhanced. In an installation method of equipment, a pit can unit in which an upper side frame, a pit can, various reinforcing steels including vertical reinforcing bars reinforcing the above from a periphery, and an anchor plate supporting mechanism are integrated is manufactured in advance, and the pit can unit is placed on an MMR via a lower side frame. Further, an anchor bolt unit is disposed on the anchor plate supporting mechanism after primary concrete is deposited, a relative positional relationship of respective foundation bolts relative to the pit can is corrected by using a template, and secondary concrete is deposited under the state in which the positional relationship is corrected. After that, the ECCS pump is carried into the pit can, and an installation of the ECCS pump is completed by fixing the carried ECCS pump through the respective foundation bolts of which bottom sides are embedded.

4 Claims, 16 Drawing Sheets

(56) References Cited

U.S. PATENT DOCUMENTS

| | | | | |
|---|---|---|---|---|
| 4,123,323 A | * | 10/1978 | Weber et al. | 376/272 |
| 4,627,213 A | * | 12/1986 | Magnin | 52/745.02 |
| 4,675,152 A | * | 6/1987 | Verdeau et al. | 376/400 |
| 5,748,690 A | * | 5/1998 | Matsuura et al. | 376/260 |
| 5,966,882 A | * | 10/1999 | Naito | 52/295 |
| 7,342,989 B2 | * | 3/2008 | Pennington et al. | 376/272 |
| 7,618,217 B2 | * | 11/2009 | Henderson | 405/255 |
| 7,677,522 B2 | * | 3/2010 | Bakos | 248/500 |
| 7,684,535 B2 | * | 3/2010 | Hirako | 376/293 |

OTHER PUBLICATIONS

International Preliminary Report on Patentability issued by the International Bureau of WIPO on Apr. 21, 2011, for International Application No. PCT/JP2009/064543.

* cited by examiner

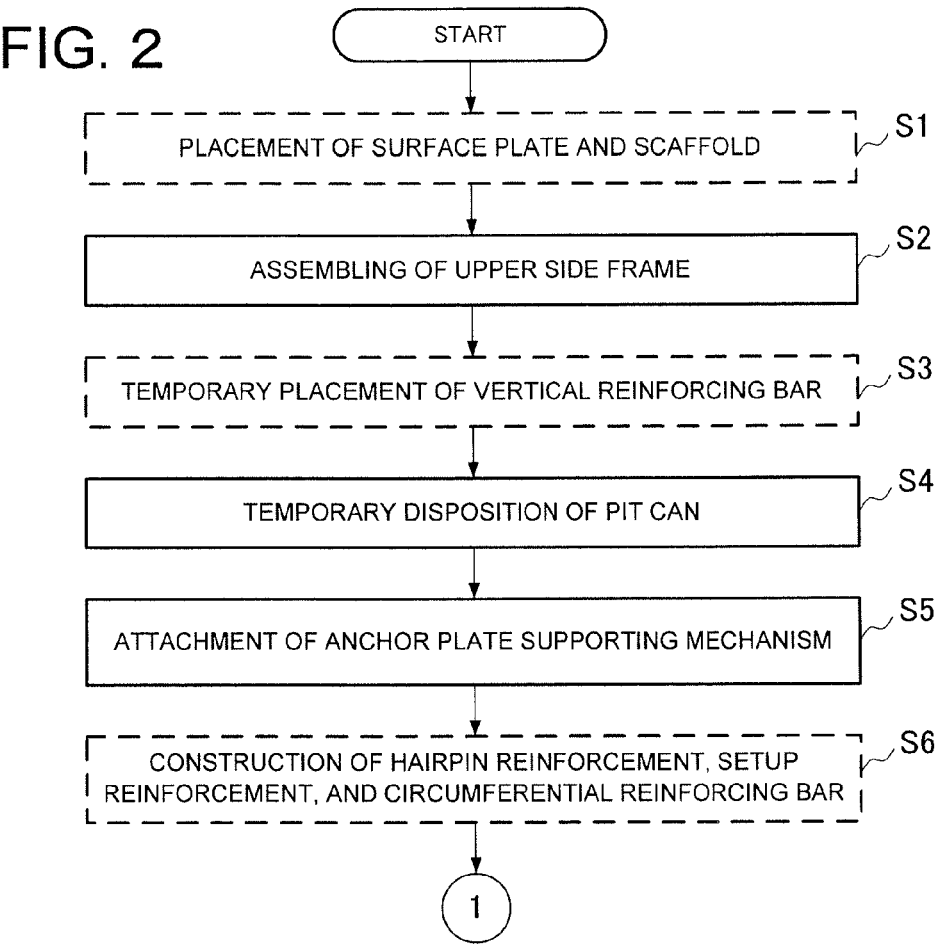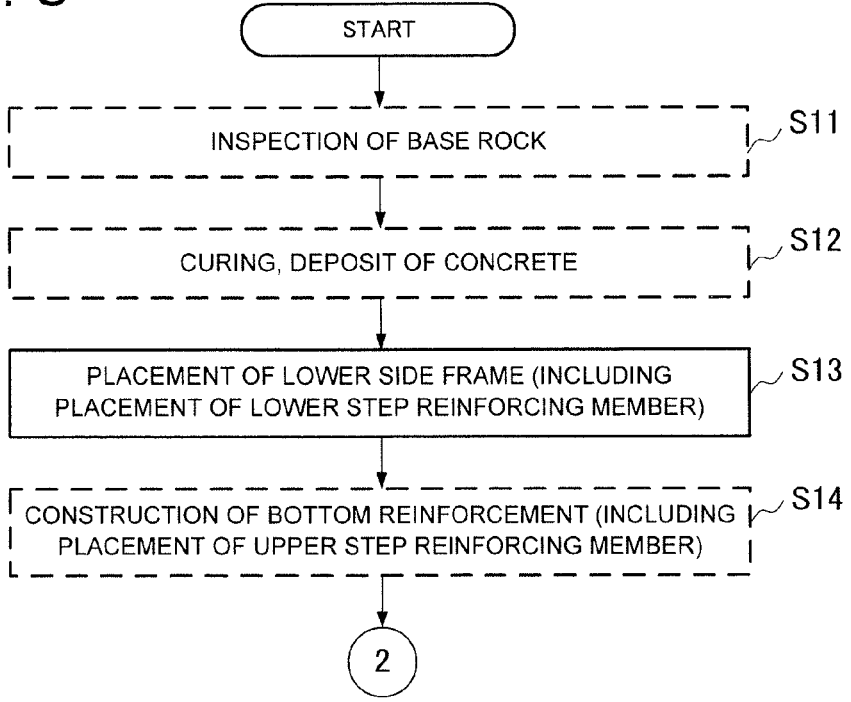

ENLARGED VIEW OF A PART

ENLARGED VIEW OF B PART

C-C CROSS SECTION

D-D CROSS SECTION

E-E CROSS SECTION

METHOD OF INSTALLING EQUIPMENT INTO A PIT CONTAINER USING AN ANCHOR MEMBER SUPPORTING MECHANISM AND AN ANCHOR BOLT UNIT

TECHNICAL FIELD

The present invention relates to an installation method of equipment such as a vertical pump used at, for example, an atomic power plant, an anchor member supporting mechanism and an anchor bolt unit used when the installation method of equipment is executed.

BACKGROUND ART

Conventionally, a bottomed cylindrical container made of a steel plate called as a pit can is used for a placement of, for example, a large vertical pump in an atomic power plant and so on. The vertical pump and so on is fixed by foundation bolts under a state that a lower side of a pump main body is inserted into the pit can embedded in base concrete.

Besides, an installation method and so on to efficiently install the pit can are proposed. Namely, anchor bolts for equipment installation such as the vertical pump are attached at a periphery of the pit can in advance at a manufacturing factory in this installation method. Further, a coupling member is attached at a bottom portion of the pit can. After that, a pit can module is formed by attaching reinforcing steels for reinforcement at the periphery of the pit can in this installation method. Further, the pit can module is mounted on a member to be coupled placed on a base of an installation field of the vertical pump and so on via the coupling member in this installation method. After that, an installation of the pit can main body is completed by depositing concrete.

PRIOR ART REFERENCES

Patent References

Reference 1: JP-A 2004-309406 (KOKAI)
Reference 2: JP-A 2002-147392 (KOKAI)

SUMMARY OF THE INVENTION

Problems to Be Solved by the Invention

However, in the above-stated installation method, the anchor bolds for equipment installation are attached at the periphery of the pit can main body when the pit can module is manufactured. After that, the installation method further goes through a working process in which the reinforcing steels for reinforcement are attached at the periphery of the pit can main body. Accordingly, a relatively difficult work to place the reinforcing steels at the periphery of the pit can while avoiding interference with the anchor bolts on component layout is required in this installation method. It is therefore required to improve working efficiency as for the installation work of equipment including the installation of the pit can.

The present invention is made to solve the above-stated problems and an object thereof is to provide an installation method of equipment, an anchor member supporting mechanism, and an anchor bolt unit capable of enhancing installation work efficiency of the equipment.

Means for Solving the Problems

To attain the above-stated object, an installation method of equipment according to an aspect of the present invention includes: disposing a first frame at a position different from an installation location of the equipment; disposing reinforcing steels to reinforce the first frame and a pit container in a bottomed cylindrical state to be placed on the first frame from a periphery thereof; placing the pit container on the first frame positioning inside the reinforcing steels; attaching an anchor member supporting mechanism to the pit container, the anchor member supporting mechanism including a supporting member to support an anchor member in a ring state at an outer peripheral side of the pit container, and a reinforcing member in a ring state having a center hole and in which a part of each reinforcing steel is penetrated from a gap formed between the center hole and an outer peripheral portion of the pit container while reinforcing the supporting member from the outer peripheral side of the pit container; placing a second frame on a base to be the installation location of the equipment; placing a pit container unit on the second frame via the first frame, the pit container unit being formed by integrating the first frame, the reinforcing steels, the pit container and the anchor member supporting mechanism; embedding a portion at a lower side than the anchor member supporting mechanism of the pit container unit, together with the second frame, by primary concrete; disposing an anchor bolt unit in which respective bottom sides of plural foundation bolts for equipment installation are respectively fixed to the anchor member on the anchor member supporting mechanism after the embedding by the primary concrete; correcting a relative positional relationship of the respective foundation bolts relative to the pit container by using a template member having plural positioning holes into which the plural foundation bolts on the anchor bolt unit can be individually inserted from upper end sides thereof; embedding the pit container unit and the anchor bolt unit by secondary concrete except the template member under a state in which the positional relationship is corrected, an opening portion at upward of the pit container, and upper end sides of the plural foundation bolts; and carrying the equipment into the pit container after the template member is removed and fixing the carried equipment through the respective foundation bolts of which bottom sides are embedded.

In this installation method, the pit container unit in which the first frame, the pit container, the reinforcing steels reinforcing the above from a periphery, and the anchor member supporting mechanism are integrated is manufactured in advance, and the pit container unit is placed on a base to be the installation location of the equipment via the first and second frames. Further, in the installation method, the anchor bolt unit is disposed on the anchor member supporting mechanism after the portion at the lower side than the anchor member supporting mechanism of the pit container unit is embedded by primary concrete. Next, in this installation method, the relative positional relationship of the respective foundation bolts on the anchor bolt unit relative to the pit container is corrected by using the template member. Further, in this installation method, secondary concrete is deposited under the state in which the positional relationship of the respective foundation bolts is corrected. After that, in this installation method, the equipment is carried into the pit container, and an installation of the equipment such as a vertical pump is completed by fixing the carried equipment through the respective foundation bolts of which bottom sides are embedded.

Namely, the installation method of equipment according to this aspect is the one in which the reinforcing steels to reinforce the first frame and the pit container from the periphery thereof are disposed before the anchor bolt unit in which the plural foundation bolts are fixed is disposed at the pit container side. Accordingly, it is possible to perform the disposition work of the reinforcing steels around the pit container relatively easily without concerning the interference with the foundation bolts and so on, on the component layout according to the installation method. Besides, according to the installation method, it is possible to dispose the anchor bolt unit on the anchor member supporting mechanism under a state in which a part of each reinforcing steel is penetrated from a gap formed between the center hole of the ring state reinforcing member included by the anchor member supporting mechanism and the outer peripheral portion of the pit container (namely, under a state in which the positions of the reinforcing steels are controlled). According to the installation method, it is possible to improve the workability at the component disposition time.

Besides, the supporting member of the anchor member supporting mechanism may be made up of, for example, plural plate state members respectively protruding in a radial pattern from an outer peripheral portion of the pit container. Besides, the reinforcing member in the ring state may be made up to integrally support the plural plate state members from a bottom side.

Further, the anchor bolt unit is made up by respectively welding the respective bottom sides of the plural foundation bolts at predetermined positions on the anchor member respectively corresponding to positions of plural installation holes bored at a casing of the equipment in advance and positions of the plural positioning holes on the template member and so on. As stated above, it is possible to further improve the workability at the equipment installation time by applying the anchor bolt unit in which the plural foundation bolts and the anchor member are integrated in advance.

Effect of the Invention

According to the present invention, it is possible to provide the installation method of equipment, the anchor member supporting mechanism, and the anchor bolt unit capable of enhancing the efficiency of the installation work of equipment.

BRIEF DESCRIPTION OF DRAWINGS

FIG. 2 is a flowchart illustrating a manufacturing procedure of a pit can unit.

FIG. 3 is a flowchart illustrating a construction procedure of a lower side frame.

EMBODIMENTS FOR CARRYING OUT THE INVENTION

Figure 1:
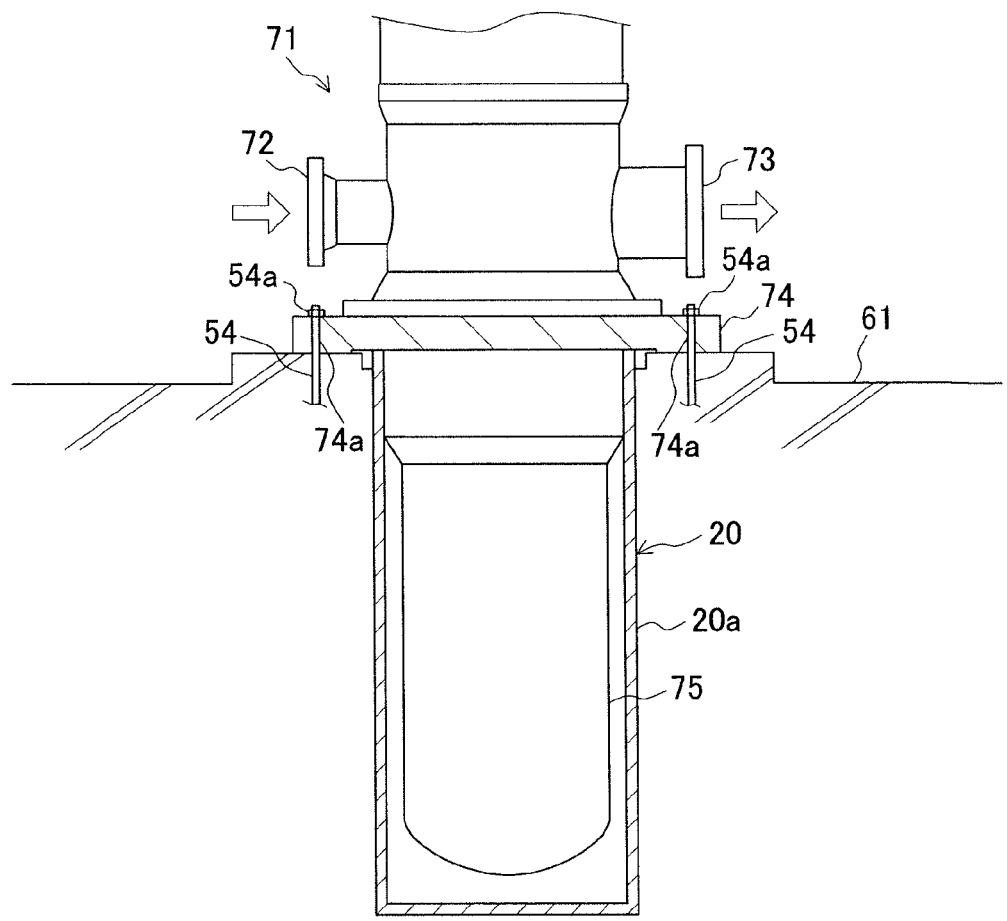
FIG. 1 is a partial sectional view schematically illustrating a state in which an ECCS pump is installed by an installation method of equipment according to an embodiment of the present invention.

Hereinafter, embodiments of the present invention are described based on the drawings. Here, FIG. 1 is a partial sectional view schematically illustrating a state in which an ECCS (Emergency Core Cooling System) pump 71 is installed by an installation method of equipment according to an embodiment of the present invention. Note that a peripheral structure at an embedded portion of the ECCS pump 71 is not illustrated in FIG. 1.

As illustrated in FIG. 1, the ECCS pump 71 is one of equipments placed in an atomic power plant and so on. The ECCS pump 71 is a vertical pump to supply cooling water to a reactor core in an emergency. The ECCS pump 71 includes a base part 74 and a lower casing 75 constituting a casing portion (a casing of a pump main body called also as a barrel), a water inlet part 72 where the water is entered, and a water outlet part 73 to be a discharge side of water, and so on.

The ECCS pump 71 is installed under a state in which the lower casing 75 is accommodated in a later-described pit can 20a of a pit can unit 20 embedded inside secondary concrete (concrete body) 61. In detail, plural installation holes 74a for equipment installation are bored in advance at the base part 74. The ECCS pump 71 is installed on the secondary concrete 61 under a state in which respective foundation bolts 54 of which bottom sides are embedded are inserted into these installation holes 74a, and engaged by nuts 54a.

Figure 4:
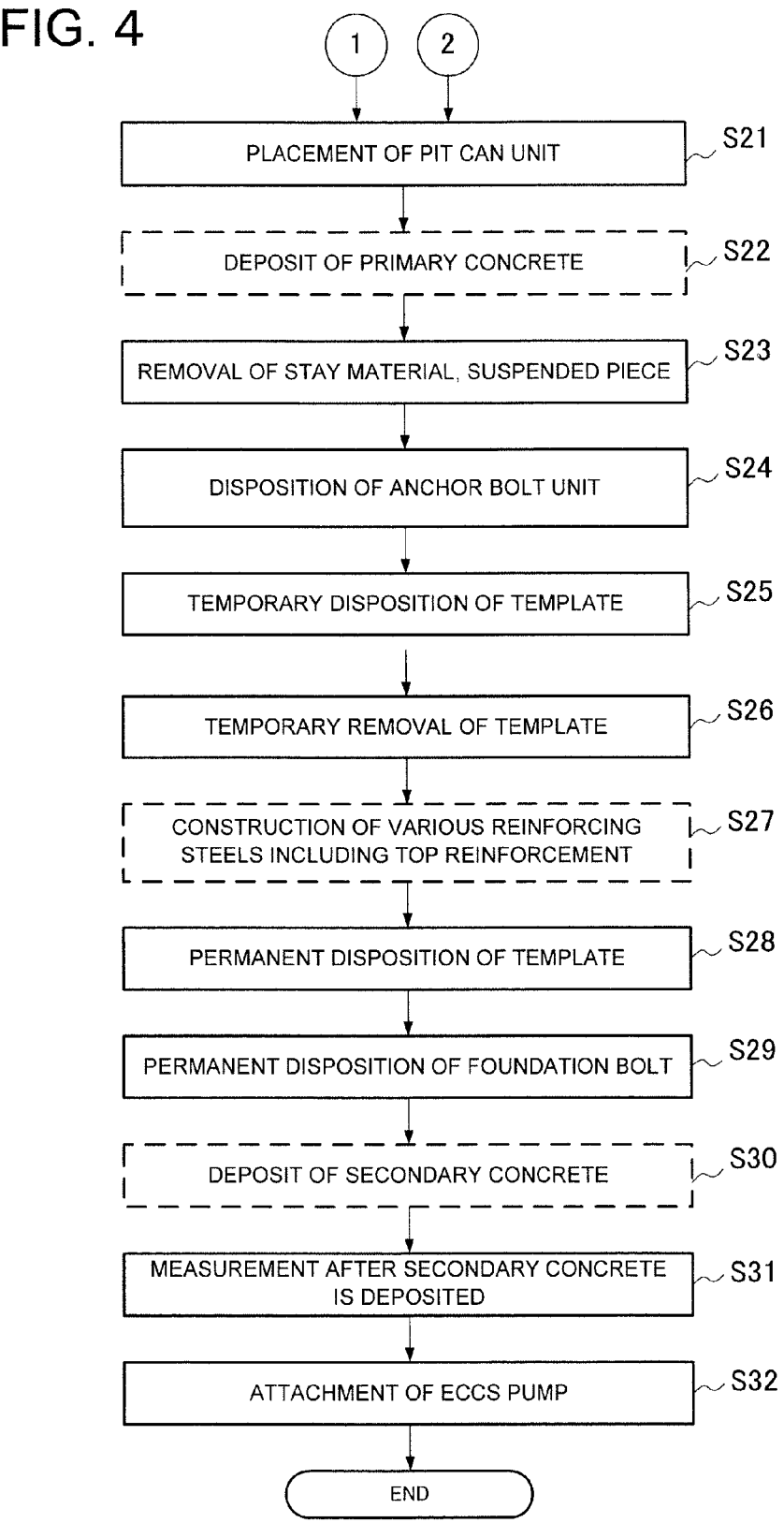
FIG. 4 is a flowchart illustrating a placement procedure of a pit can unit used for the installation of the ECCS pump in FIG. 1.

Next, the installation method of equipment of the present embodiment is described by using flowcharts illustrated in FIG. 2 to FIG. 4, and views mechanically illustrating respective working processes of FIG. 1 and FIG. 5 to FIG. 24. Here, the working processes illustrated by dotted lines in FIG. 2 to FIG. 4 represent construction side works (works relating to construction application), on the other hand, the working processes illustrated by solid lines represent mechanical side works (works relating to attachment of various components) other than the construction side works.

Figure 5:
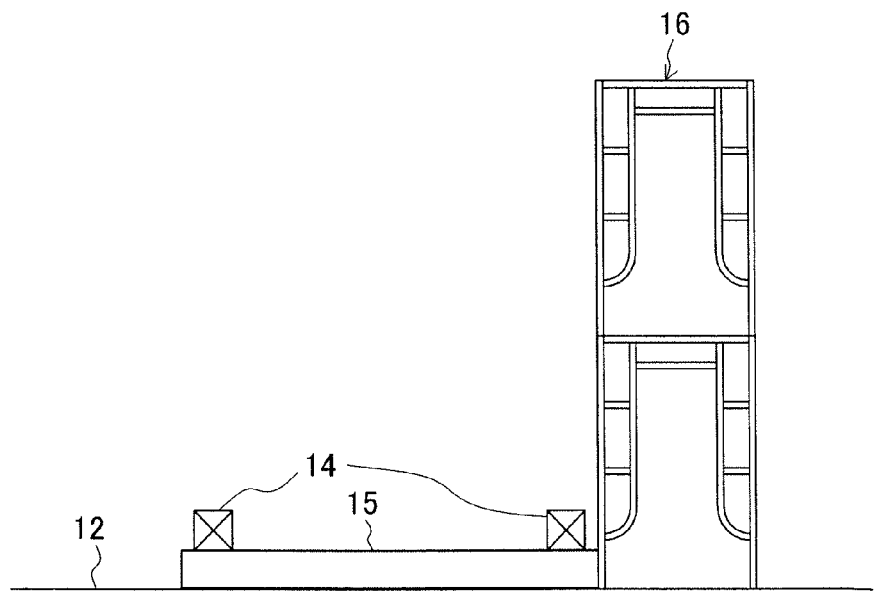
FIG. 5 is a sectional view illustrating a state in which a surface plate and a scaffold are placed on the other ground line different from an installation location of the ECCS pump in FIG. 1.

At first, as illustrated in FIG. 2 and FIG. 5, a surface plate (ground assembling surface plate) 15 is placed on a G.L (Ground Line) 12 by the construction side work at the other location (manufacturing factory and so on) different from a final installation location of the ECCS pump 71. Besides, temporary receiving structures 14 are provided on the surface plate 15. Further, a scaffold (ground assembling scaffold) 16 is provided on the G.L 12 (S[ step]1).

Figure 6:
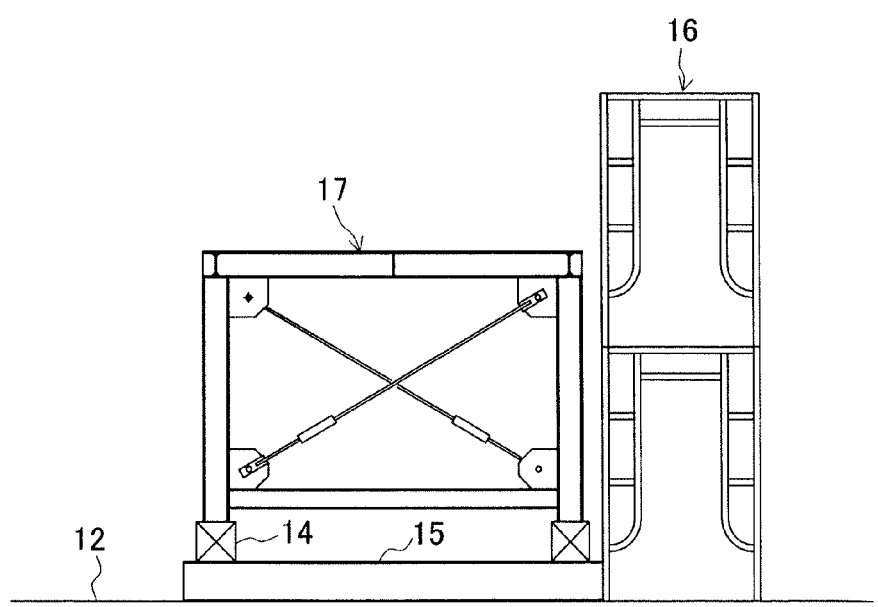
FIG. 6 is a sectional view illustrating a state in which an upper side frame is placed on the surface plate in FIG. 5.

Next, as illustrated in FIG. 2 and FIG. 6, an upper side frame (first frame) 17 made of, for example, steel to place the pit can 20a on the surface plate 15 via the temporary frame 14 is mounted and a level adjustment in a height direction is performed (S2).

Figure 7:
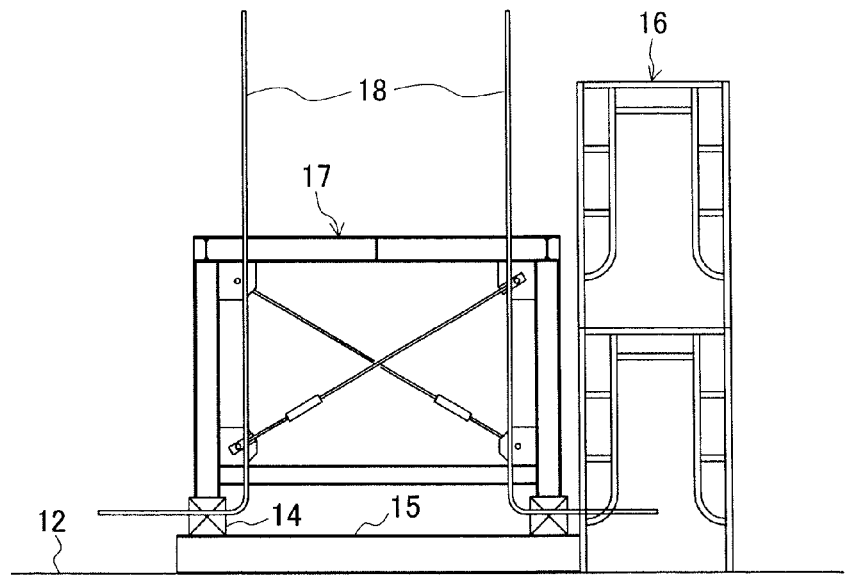
FIG. 7 is a sectional view illustrating a state in which vertical reinforcing bars are disposed at a periphery of the upper side frame in FIG. 6.

Further, as illustrated in FIG. 2 and FIG. 7, vertical reinforcing bars 18 to be reinforcing steels to reinforce the upper side frame 17 and the pit can 20a from a periphery thereof are disposed (inserted and temporary disposed) by the construction side work so that an upper side thereof becomes a posture standing in a vertical direction (S3) before the pit can 20a is placed (temporary set) on the upper side frame 17.

Figure 8:
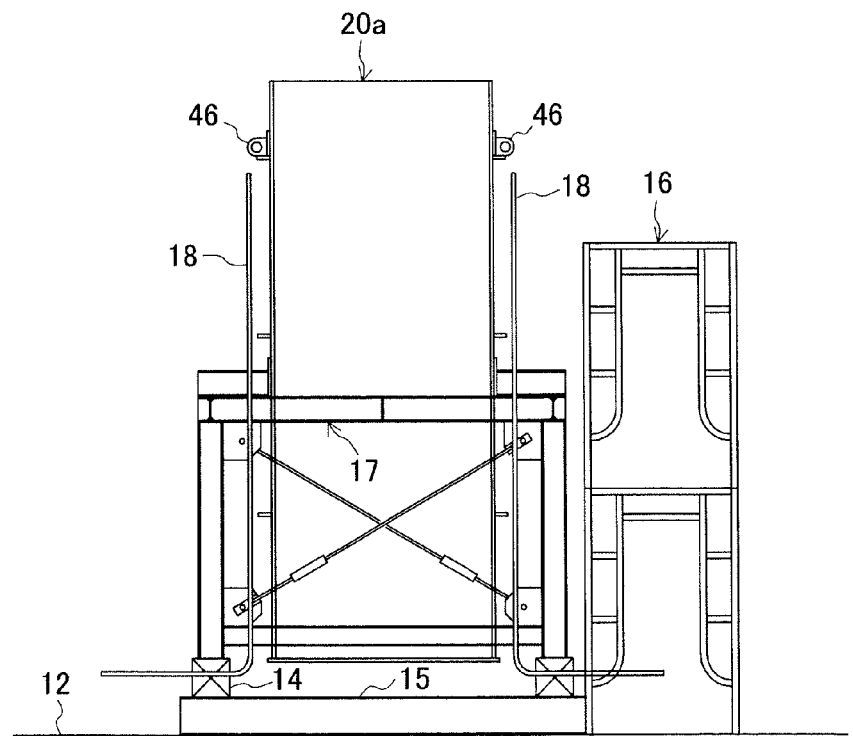
FIG. 8 is a sectional view illustrating a state in which a pit can is temporary placed relative to the upper side frame in FIG. 6.

Next, as illustrated in FIG. 2 and FIG. 8, a temporary placing (temporary setting) of the pit can 20a to which suspended pieces (suspended clasps) 46 are attached is performed by suspending on the upper side frame 17 by an equipment side work (S4). Here, the pit can 20a is constituted by a bottomed cylindrical pit container made of, for example, a steel plate having a space capable of accommodating the lower casing 75 of the ECCS pump 71 from an upper side as illustrated in FIG. 1 and FIG. 8.

Subsequently, as illustrated in FIG. 2 and FIG. 9A to FIG. 9C, an anchor plate supporting mechanism (anchor member supporting mechanism) 21 including an anchor plate supporting member (called also as an anchor plate receiving beam) 22 functioning as a supporting member and a ring state dummy anchor plate 22a functioning as a reinforcing member are attached to a pit can 20a side (S5). Here, the anchor plate supporting member 22 is constituted by plural plate state (or block state) members respectively protruding from an outer peripheral portion of the pit can 20a in a radial pattern. The anchor plate supporting member 22 supports a later-described ring state anchor plate 58 (refer to FIG. 20) at an outer peripheral side of the pit can 20a.

Figure 9A:
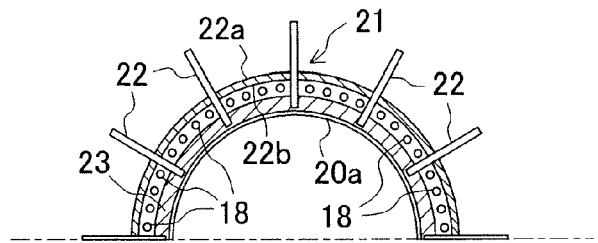
FIG. 9A is a plan view illustrating an anchor plate supporting mechanism disposed around the pit can.
Figure 9B:
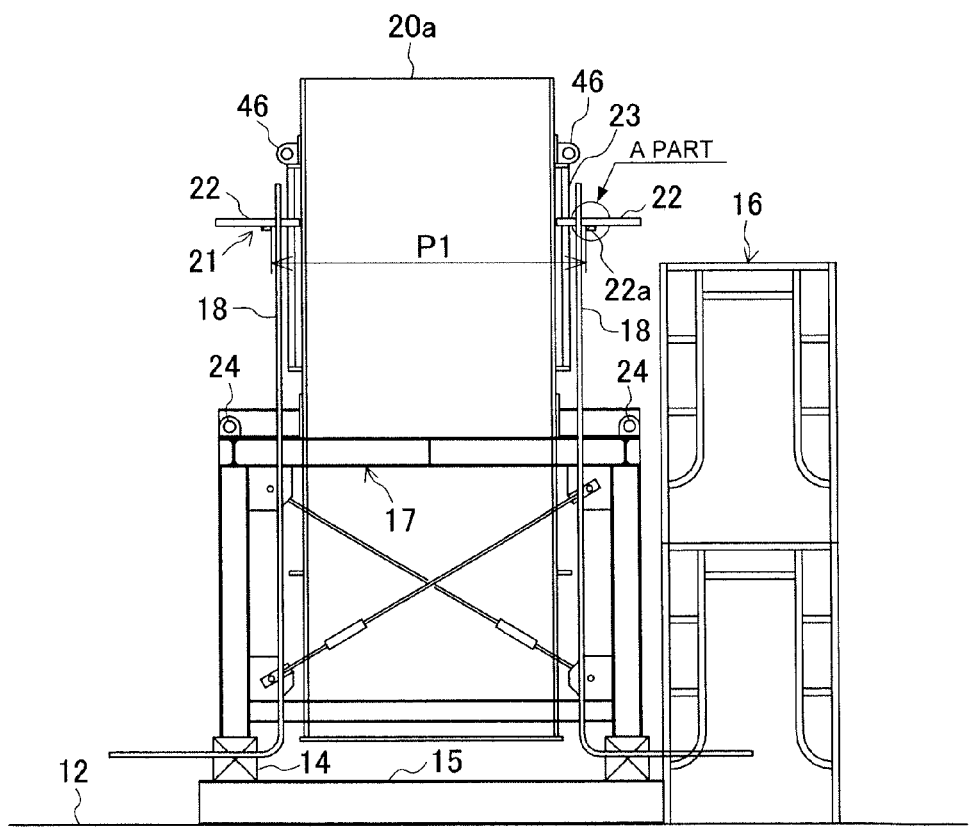
FIG. 9B is a sectional view illustrating a state in which the anchor plate supporting mechanism is disposed around the pit can in FIG. 8.

Here, the attachment of the anchor plate supporting member 22 is described in more detail. As illustrated in FIG. 9A and FIG. 9B, marking positions of an angle member 23 attached to the pit can 20a are checked. For example, 12 pieces of anchor plate supporting members 22 are welded at the marking positions (positions spaced with intervals of, for example, every 30 degrees in a circumferential direction of the angle member 23) of the angle member 23. At this time, it should be noted not to directly weld the anchor plate supporting member 22 and the pit can 20a. Besides, suspended pieces (suspended clasps) 24 are attached to the upper side frame 17 as illustrated in FIG. 9B.

Figure 9C:
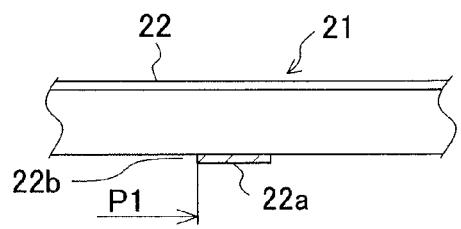
FIG. 9C is an enlarged view of an A part in FIG. 9B.

As illustrated in FIG. 9A to FIG. 9C, the ring state dummy anchor plate 22a has a center hole 22b formed with, for example, an inside diameter of P1. The dummy anchor plate 22a reinforces the anchor plate supporting member 22 from an outer peripheral side of the pit can 20a. In the dummy anchor plate 22a, a part (a tip portion) of each vertical reinforcing bar 18 is penetrated from a gap formed between the center hole 22b and the outer peripheral portion of the pit can 20a as illustrated in FIG. 9A.

Figure 10A:
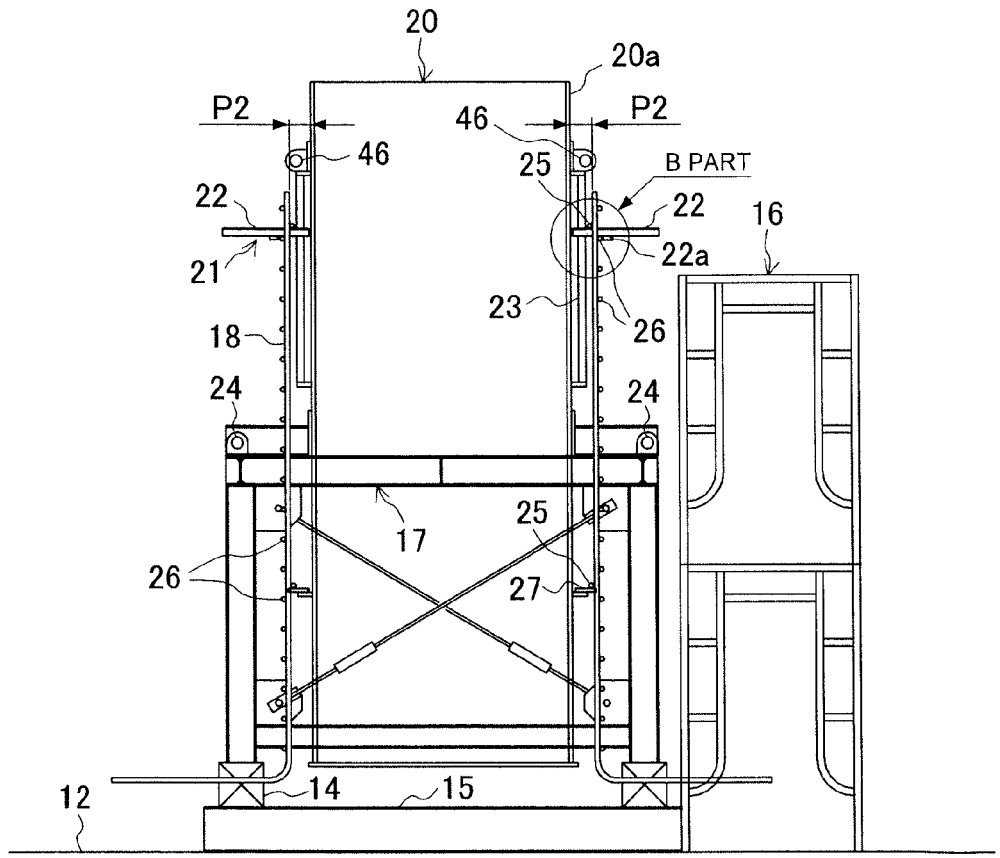
FIG. 10A is a sectional view illustrating a state in which the pit can and the anchor plate supporting mechanism in FIG. 9B are reinforced by various reinforcing bars including the vertical reinforcing bars.
Figure 10B:
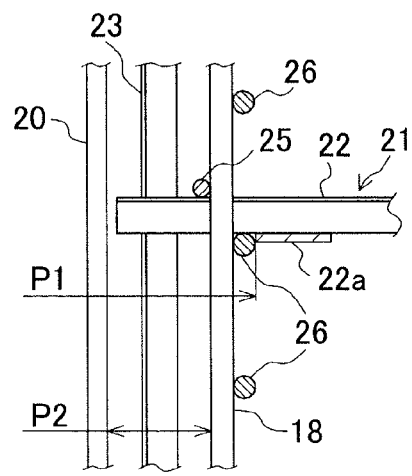
FIG. 10B is an enlarged view of a B part in FIG. 10A.

Next, as illustrated in FIG. 2, FIG. 10A and FIG. 10B, a ground assembling of reinforcing steels for reinforcement around the pit can 20a is performed. Namely, circumferential reinforcing bars 26, hairpin reinforcements 27, and setup reinforcements 25 are placed (S6). The circumferential reinforcing bar 26 is a reinforcing steel to reinforce an outer peripheral side of the vertical reinforcing bar 18. The hairpin reinforcement 27 is a reinforcing steel to reinforce between an inner side of the vertical reinforcing bar 18 and the lower side of the pit can 20a. The setup reinforcement 25 is a reinforcing steel to reinforce between the inner side of the vertical reinforcing bar 18 and the anchor plate supporting member 22, and between the inner side of the vertical reinforcing bar 18 and the hairpin reinforcement 27.

When the reinforcing steels for reinforcement as stated above are placed, the ground assembling of the reinforcing bars around the pit can 20a is performed so that a separation distance P2 falls within a tolerance range in consideration of the inside diameter P1 of the dummy anchor plate 22a as illustrated in FIG. 10A and FIG. 10B, and thereby, the vertical reinforcing bars 18 are permanently placed. The separation distance P2 is a distance between the outer peripheral portion of the pit can 20a and the inner side portion of the vertical reinforcing bar 18. The pit can unit (pit container unit) 20 in which the upper side frame 17, the pit can 20a, the anchor plate supporting mechanism 21, and the reinforcing steels (the vertical reinforcing bars 18, the circumferential reinforcing bars 26, the hairpin reinforcements 27, and the setup reinforcements 25) around the pit can 20a including the vertical reinforcing bars 18 are unitized (prefabricated), is thereby constituted. Here, in the installation method of equipment of the present embodiment, the reinforcing steels (the vertical reinforcing bars 18, the circumferential reinforcing bar 26, and so on) around the pit can 20a are constructed as illustrated in FIG. 10A and FIG. 10B before a later-described anchor bolt unit 57 to which the foundation bolts 54 are fixed is disposed at the pit can 20a side. According to the installation method of equipment of the present embodiment, it is possible to easily perform a disposing work of the reinforcing steels around the pit can 20a without concerning interference with the foundation bolts 54 on a component layout.

On the other hand, the ground is dug down until a base rock exposes at the installation location of the ECCS pump 71, and an inspection of the exposed base rock is performed as illustrated in FIG. 3 (S11). Next, concrete is deposited on the base rock after the inspection is completed while curing is performed (S12), and an MMR (MerMaid Rock) 11 being so-called an artificial base rock is formed as illustrated in FIG. 11A.

Figure 11A:
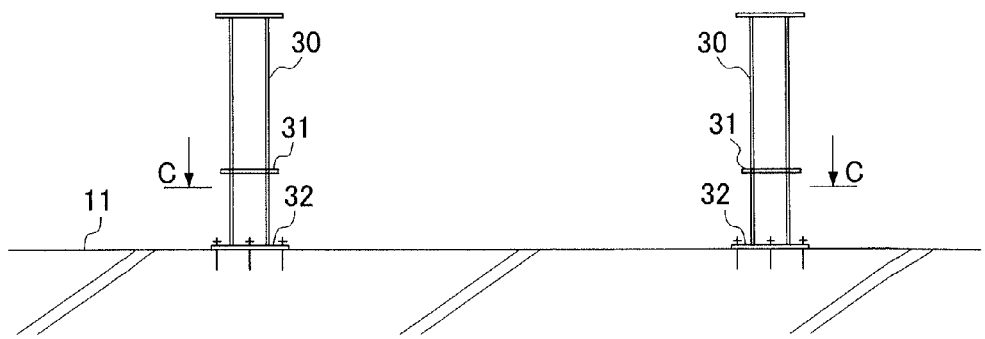
FIG. 11A is a sectional view illustrating a state in which a lower side frame is placed on a mermaid rock to be an installation location of the ECCS pump in FIG. 1.
Figure 11B:
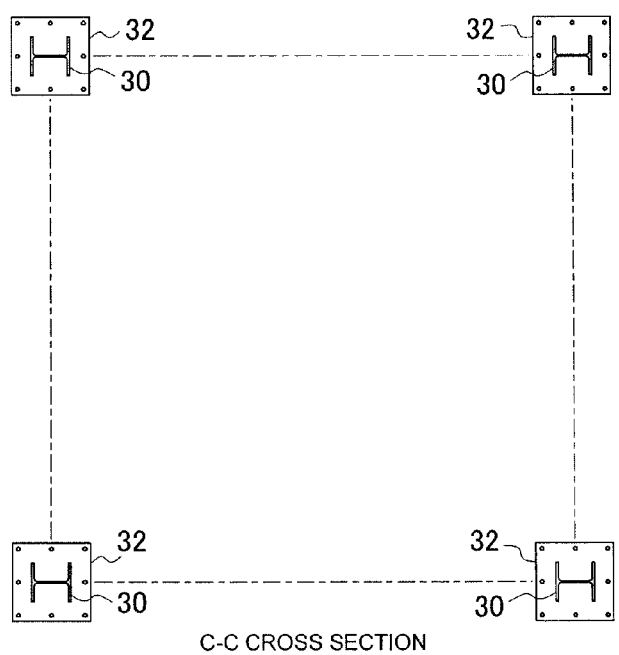
FIG. 11B is a C-C sectional view of FIG. 11A.

Subsequently, as illustrated in FIG. 11A and FIG. 11B, a post cast plate 32 is placed on the MMR 11 via a metal anchor and so on after a marking of a placement position of a lower side frame (second frame) 30 constituted by steel and so on for placing the pit can unit 20 is performed on the MMR 11.

Figure 12:
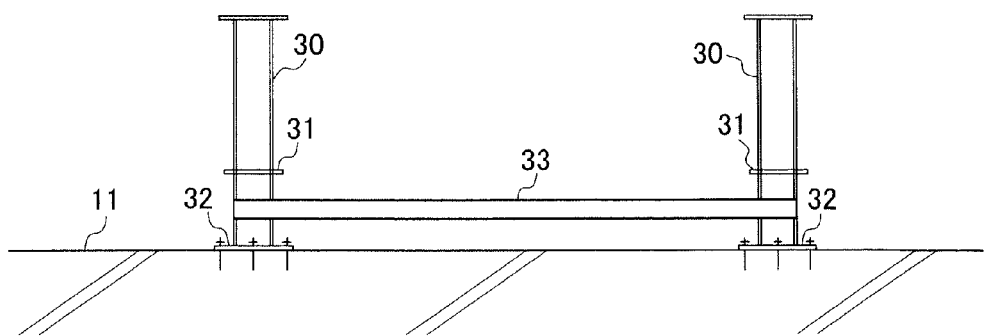
FIG. 12 is a sectional view illustrating a state in which lower step reinforcing members are attached to the lower side frame in FIG. 11A.

Further, the lower side frame 30 which is already prefabricated (which is already component processed and temporary assembled) is carried in by using a crane and so on. After a positioning and a level adjustment (height adjustment) of the carried lower side frame 30 are performed, respective leg parts of the lower side frame 30 are fixed on the post cast plate 32 by welding. Besides, span seals 31 as a sealing material are attached to the respective leg parts of the lower side frame 30 as illustrated in FIG. 3 and FIG. 12. Further, lower step reinforcing members 33 are stretched across at the lower side of adjacent leg parts of the lower side frame 30 with each other to reinforce the lower side frame 30 (S13).

Figure 13A:
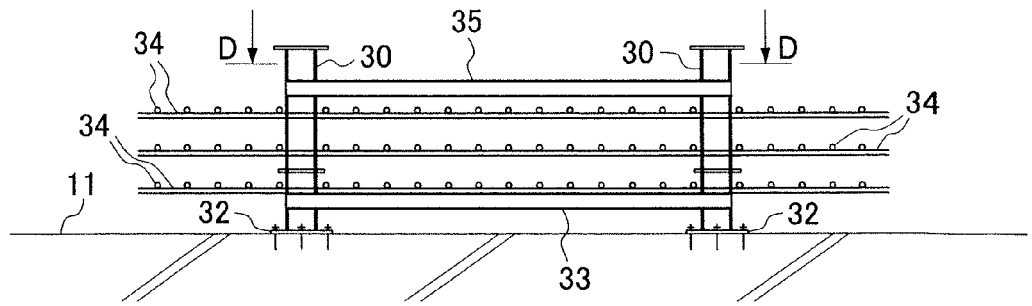
FIG. 13A is a sectional view illustrating a state in which bottom reinforcements are placed at a periphery of the lower side frame in FIG. 12.
Figure 13B:
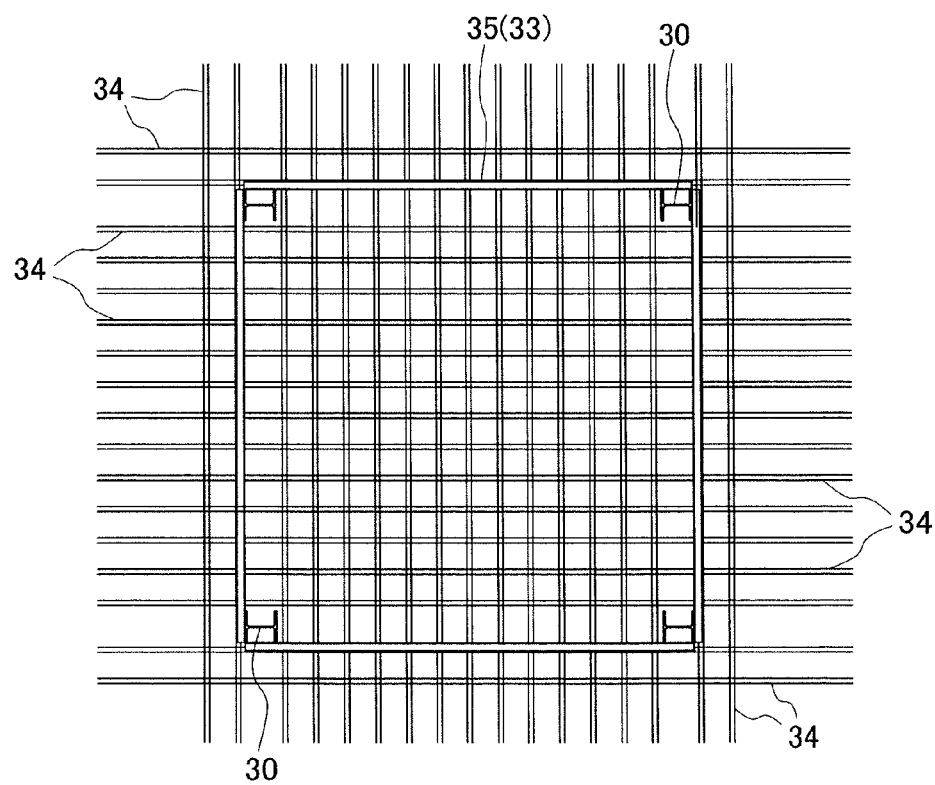
FIG. 13B is a D-D sectional view of FIG. 13A.
Figure 14:
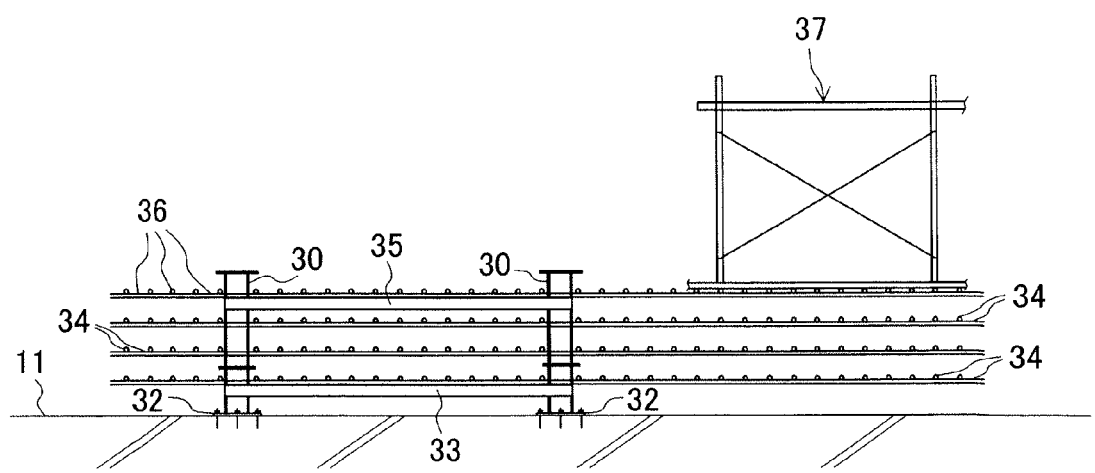
FIG. 14 is a sectional view illustrating a state in which remaining bottom reinforcements and reinforcement frames are placed at the periphery of the lower side frame.

After the lower side frame 30 is placed, bottom reinforcements (reinforcing steels for reinforcement of bottom end portion) 34 are disposed in a matrix state as illustrated in FIG. 3, FIG. 13A, and FIG. 13B. Next, units of the bottom reinforcements 34 are disposed in the matrix state are overlaid for three steps, upper step reinforcing members 35 are stretched across at upper sides of the adjacent leg parts of the lower side frame 30 with each other, to further reinforce the lower side frame 30 (S14). Next, as illustrated in FIG. 14, bottom reinforcements (reinforcing steels) 36 are disposed in a matrix state at a further upper part of the upper step reinforcing members 35. Subsequently, a work reinforcement frame 37 is placed in a vicinity of the lower side frame 30 on the bottom reinforcements 36.

Figure 15:
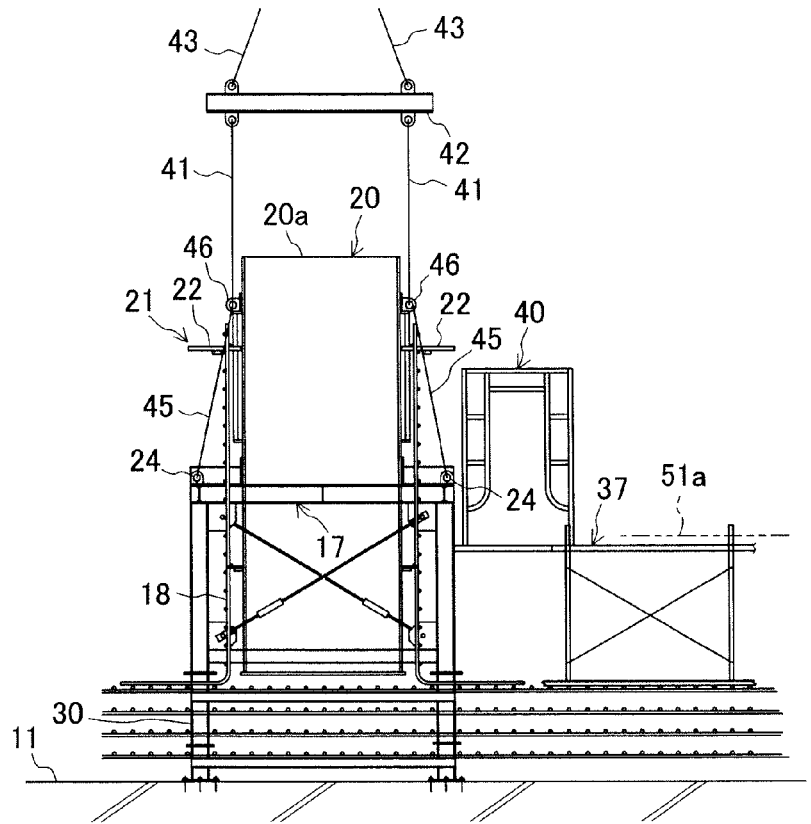
FIG. 15 is a sectional view illustrating a state in which the pit can unit in FIG. 10 is carried in on the lower side frame in FIG. 14.

Next, as illustrated in FIG. 15, a work scaffold 40 is placed by using the reinforcement frame 37. After that, wires 41, 43 and a suspended balance 42 are attached to the pit can unit 20 carried from a temporary assembling location. In this state, the pit can unit 20 is suspended in (carried in) to an upper surface of the lower side frame 30, and the pit can unit 20 is placed on the lower side frame 30 via the upper side frame 17 (S21) as illustrated in FIG. 4 and FIG. 15. In detail, the upper side frame 17 is welded along with marking lines and so on marked on the lower side frames 30 in advance, and the pit can unit 20 is installed.

Figure 16:
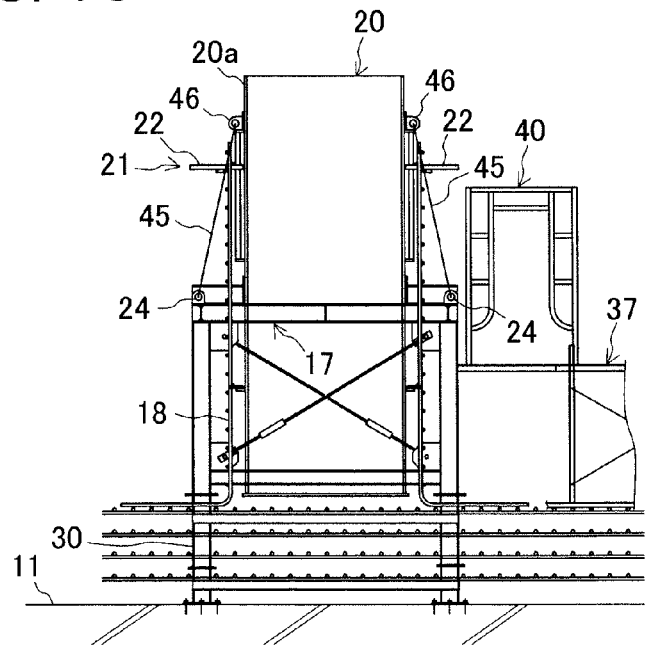
FIG. 16 is a sectional view illustrating a state in which the carried pit can unit in FIG. 15 is placed on the lower side frame.

Further, as illustrated in FIG. 15 and FIG. 16, wires (stay materials) 45 to prevent the pit can 20a from floating and falling in liquid state cement and mortar are each coupled between the suspended piece 46 at the pit can 20a side and the suspended piece 24 of the upper side frame 17. Here, it is checked if a placement position in a plane direction, a level in a height direction, and a vertical degree (and a circularity) of the pit can 20a falls within the tolerance range.

Figure 17:
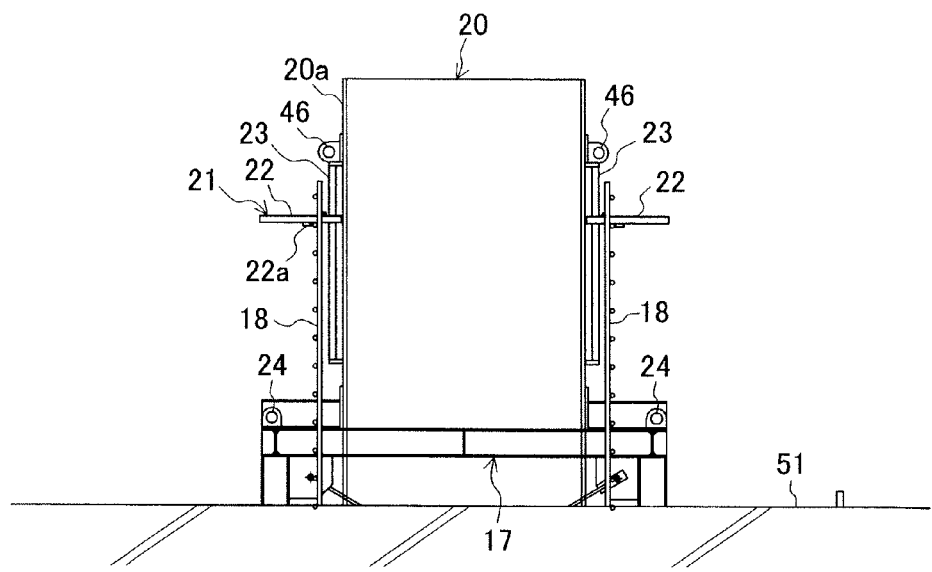
FIG. 17 is a sectional view illustrating a state in which primary concrete is deposited around the pit can unit in FIG. 16.

After that, a portion at the lower side of the pit can unit 20 than the anchor plate supporting mechanism 21 is embedded by primary concrete 51 together with the lower side frame 30 as illustrated in FIG. 4 and FIG. 17 (the primary concrete 51 is deposited up to a primary concrete deposit virtual surface 51a illustrated in FIG. 17) (S22).

Figure 18:
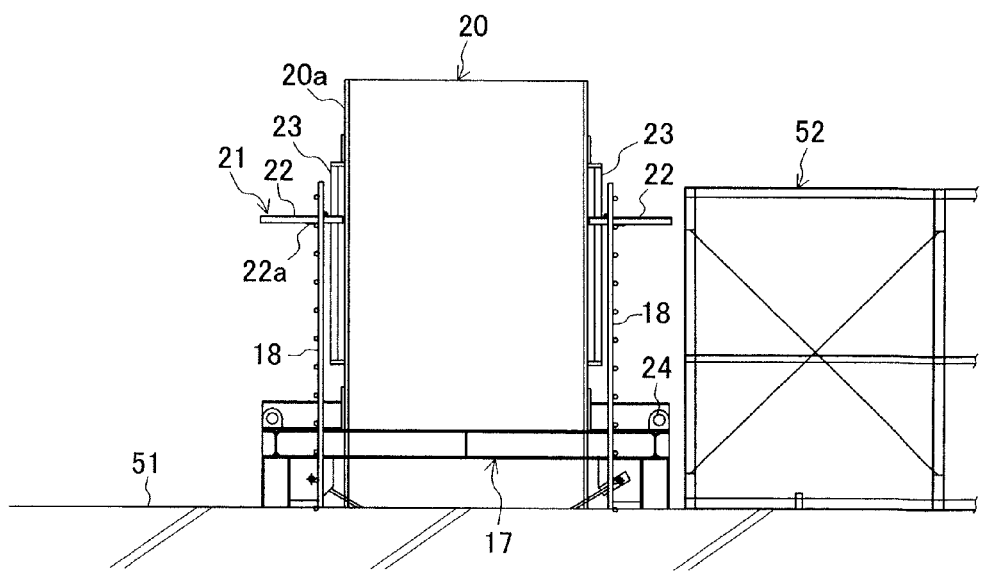
FIG. 18 is a sectional view illustrating a state in which a stay material, suspended pieces are removed from the pit can unit in FIG. 17.

As illustrated in FIG. 4 and FIG. 18, after the embedding process by the primary concrete 51 is completed, the wires 45 as the stay materials and the suspended pieces 46 of the pit can 20a are removed (S23). Next, as illustrated in FIG. 19A to FIG. 21B, the anchor bolt unit 57 to which respective bottom sides of the plural foundation bolts (called also as the anchor bolt) 54 for equipment installation are respectively fixed to the anchor plate 58 is disposed on the anchor plate supporting mechanism 21 of the pit can unit 20 as illustrated in FIG. 20 (S24). Here, in the installation method of equipment of the present embodiment, it is possible to dispose the anchor bolt unit 57 on the anchor plate supporting mechanism 21 under the state in which the tip portions of the vertical reinforcing bars 18 are penetrated from the gap formed between the center hole 22b of the ring state dummy anchor plate 22a included by the anchor plate supporting mechanism 21 and the outer peripheral portion of the pit can 20a (a state in which the positions of the reinforcing steels around the pit can 20a are controlled) as illustrated in FIG. 9A and FIG. 9B. Accordingly, the working efficiency at the component disposing time can be improved.

Figure 19A:
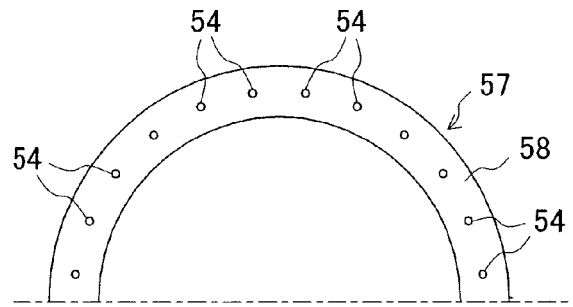
FIG. 19A is a plan view illustrating an anchor plate unit.
Figure 19B:
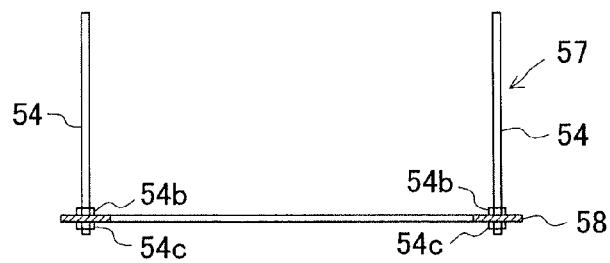
FIG. 19B is a sectional view of the anchor plate unit illustrated in FIG. 19A.
Figure 20:
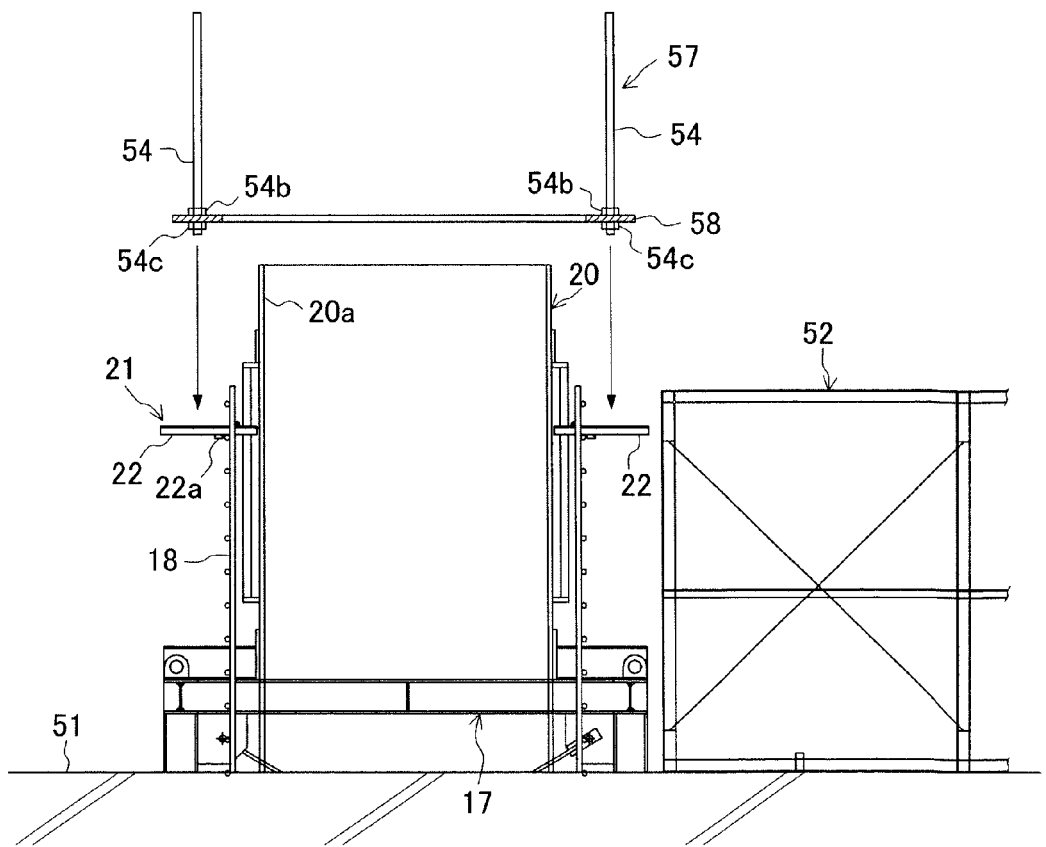
FIG. 20 is a sectional view illustrating a state just before the anchor plate unit illustrated in FIG. 19 is mounted on an anchor plate supporting mechanism at a pit can unit side.

Besides, as illustrated in FIG. 19A and FIG. 19B, in the plural foundation bolts 54 on the anchor bolt unit 57, the respective bottom sides of the foundation bolt main bodies are respectively (engaged by nuts 54b, 54c and) welded at predetermined positions on the anchor plate 58 respectively corresponding to the positions of the plural installation holes 74a bored in advance at the base part 74 of the ECCS pump 71 and positions of plural positioning holes 53a on a later-described template (template member) 53 (refer to FIG. 21A). Besides, the respective positioning holes 53a on the template 53 are bored (coaxially processed) at, for example, the same step as a boring process of the installation holes 74a on the base part 74 so as to place the foundation bolts 54 with high accuracy.

Figure 21A:
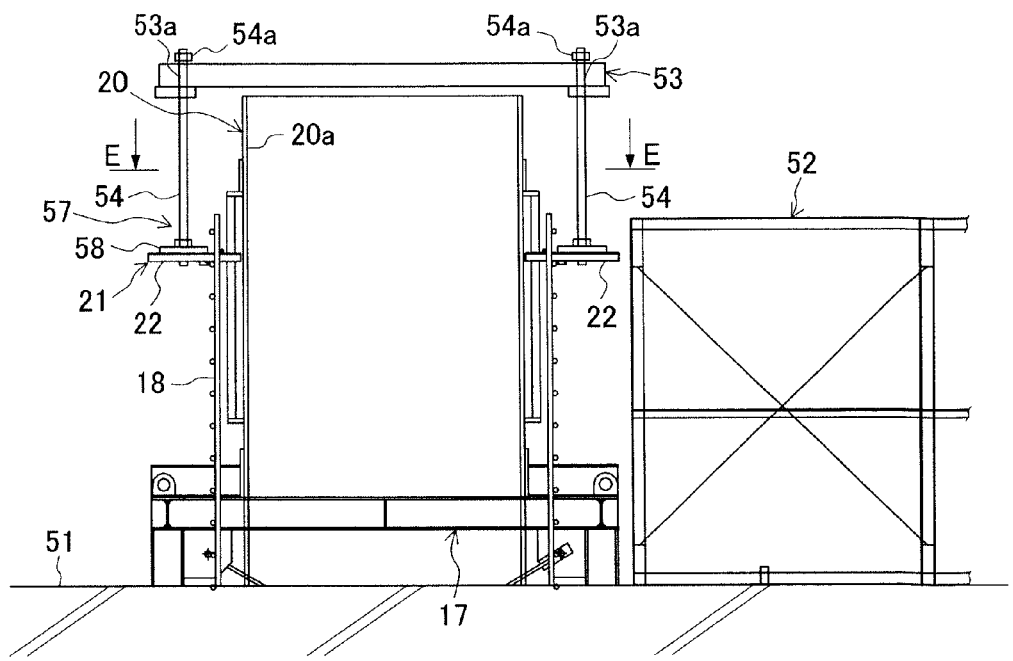
FIG. 21A is a sectional view illustrating a state in which a template is temporary placed at the pit can unit side.
Figure 21B:
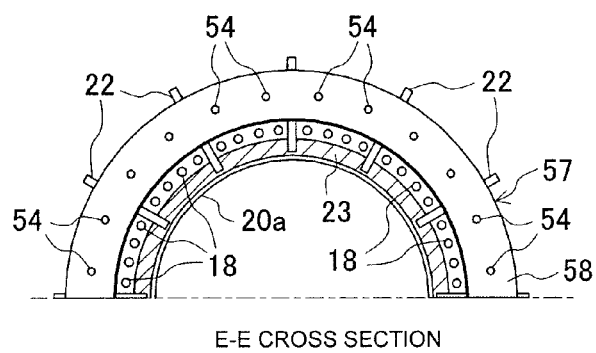
FIG. 21B is an E-E sectional view of FIG. 21A.

Further, as illustrated in FIG. 21A and FIG. 21B, a relative positional relationship of the respective foundation bolts 54 relative to the pit can 20a is corrected by using the template 53 made of, for example, a steel plate having the plural positioning holes 53a into which the plural foundation bolts 54 on the anchor bolt unit 57 can be individually inserted from upper end sides thereof. In detail, for example, the template 53 is positioned such that, for example, positions of marks marked on the template 53 in advance match with positions of marks marked on the pit can 20a in advance.

In more detail, a temporary disposition (temporary setting) of the template 53 is performed firstly as illustrated in FIG. 4, FIG. 21A, and FIG. 21B (S25). Specifically, the template 53 is fixed via the nuts 54a under the state in which the respective foundation bolts 54 are inserted into the positioning holes 53a. Further, a position (a position in height and plane directions) of the template 53 is displaced by using, for example, a liner (spacer) and so on, the positional relationship is fallen within the tolerance range, and thereafter, the anchor plate supporting member 22 on the anchor plate supporting mechanism 21 and the anchor plate 58 at a bottom portion of the anchor bolt unit 57 are spot welded.

Figure 22:
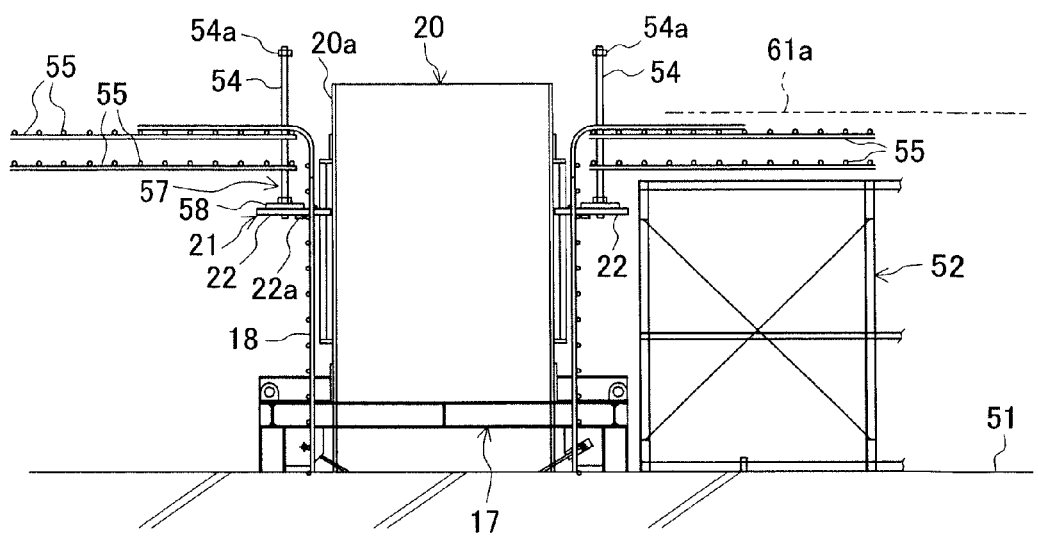
FIG. 22 is a sectional view illustrating a state in which top reinforcements are disposed at an upper portion of the pit can unit.
Figure 23:
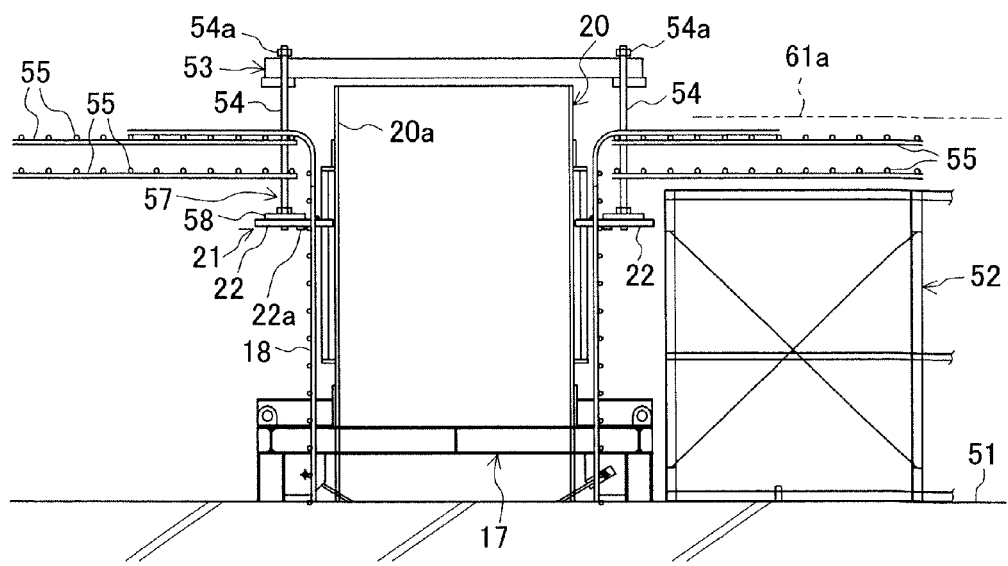
FIG. 23 is a sectional view illustrating a state in which the template is placed again at the pit can unit side where the top reinforcements are disposed at the upper portion thereof.

After that, the template 53 is temporary removed (S26), and top reinforcements 55 being reinforcing steels to reinforce around an upper side of the pit can unit 20 are disposed for, for example, two steps in a matrix state (S27) as illustrated in FIG. 4 and FIG. 22. After that, as illustrated in FIG. 4 and FIG. 23, the template 53 is placed again (permanent disposition) (S28), and the position of the template 53 is displaced. Accordingly, the relative positional relationship of the respective foundation bolts 54 relative to the pit can 20a is finally corrected (S29).

Figure 24:
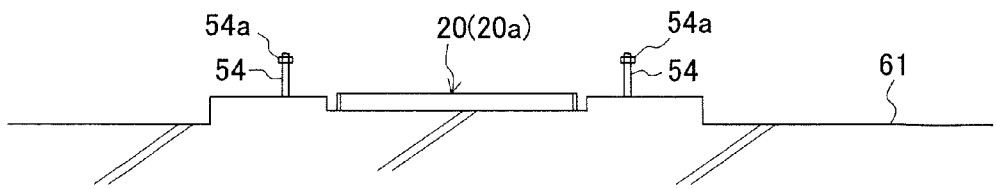
FIG. 24 is a sectional view illustrating a state in which secondary concrete is deposited around an upper side portion of the pit can unit.

Next, the pit can unit 20 and the anchor bolt unit 57 are embedded by secondary concrete 61 (deposit the secondary concrete 61 up to a secondary concrete deposit virtual surface 61a illustrated in FIG. 23) as illustrated in FIG. 4 and FIG. 24 except the template 53 in the state in which the positional relationship thereof is finally corrected, an opening portion at upside of the pit can 20a, and upper end sides of the respective foundation bolts 54 (S30).

After the secondary concrete 61 is deposited, various measurements are performed after the template 53 is removed as illustrated in FIG. 4 and FIG. 24 (S31). For example, it is checked if concentricity of a center of the template 53 and a center of the pit can 20a falls within the tolerance range. Besides, it is checked if a height level at an upper end of the foundation bolt 54 falls within the tolerance range, and so on.

Further, as illustrated in FIG. 4 and FIG. 24, the ECCS pump 71 is carried into an accommodating space of the pit can 20a after the template 53 is removed as illustrated in FIG. 1, and the carried ECCS pump 71 is fixed via the respective foundation bolts 54 of which bottom sides are embedded and the nuts 54a (S32).

As stated above, in the installation method of equipment according to the present embodiment, the pit can unit 20 in which the upper side frame 17, the pit can 20a, various reinforcing steels including the vertical reinforcing bars 18 reinforcing the above from a periphery thereof, and the anchor plate supporting mechanism 21 are integrated is manufactured in advance. Further, the manufactured pit can unit 20 is placed on the MMR 11 to be the installation location of the equipment via the lower side frame 30 and the upper side frame 17. Further, the anchor bolt unit 57 is disposed on the anchor plate supporting mechanism 21 after the portion at the lower side of the pit can unit 20 than the anchor plate supporting mechanism 21 is embedded by the primary concrete 51. Next, the positional relationship of the respective foundation bolts 54 on the anchor bolt unit 57 relative to the pit can 20a is corrected by using the template 53. Further, the secondary concrete 61 is deposited under a state in which the positional relationship of the respective foundation bolts 54 is corrected. After that, the ECCS pump 71 is carried into the pit can 20a, and the installation of the ECCS pump 71 is completed by fixing the carried ECCS pump 71 through the respective foundation bolts 54 of which bottom sides are embedded.

Namely, the installation method of equipment of the present embodiment is the method in which the reinforcing steels around the pit can 20a such as the vertical reinforcing bars 18 and the circumferential reinforcing bars 26 are disposed as illustrated in FIG. 10A and FIG. 10B before the anchor bolt unit 57 to which the plural foundation bolts are fixed is disposed at the pit can 20a side. According to the installation method of equipment of the present embodiment, it is possible to easily perform the disposition work of the reinforcing steels around the pit can 20a without concerning the interference with the foundation bolts 54 on the component layout.

Besides, according to the installation method of equipment of the present embodiment, it is possible to dispose the anchor bolt unit 57 on the anchor plate supporting mechanism 21 under the state in which the tip portions of the vertical reinforcing bars 18 are penetrated from the gap formed between the center hole 22b of the ring state dummy anchor plate 22a included by the anchor plate supporting mechanism 21 and the outer peripheral portion of the pit can 20a (namely, under the state in which the positions of the reinforcing steels around the pit can 20a are controlled) as illustrated in FIG. 9A and FIG. 9B. Accordingly, it is possible to improve the assembling workability at the component disposition time according to the installation method of equipment of the present embodiment. In other words, the dummy anchor plate 22a enables the function to reinforce the anchor plate supporting member 22 and the function to control the positions of the reinforcing steels around the pit can 20a including the vertical reinforcing bars 18 by a single member.

As stated above, the present invention is concretely described by the embodiments, but the present invention is not limited only to these embodiments, and all changes which come within the meaning and range of equivalency of the claims are therefore intended to be embraced therein.

INDUSTRIAL APPLICABILITY

The present invention is also useful in a case when an equipment, for example, such as a sump tank is installed in addition to the installation of the vertical pump such as the ECCS pump.

EXPLANATION OF NUMERALS AND SYMBOLS

17 . . . upper side frame, 18 . . . vertical reinforcing bar, 20 . . . pit can unit, 20a . . . pit can, 21 . . . anchor plate supporting mechanism, 22 . . . anchor plate supporting member, 22a . . . dummy anchor plate, 22b . . . center hole, 25 . . . setup reinforcement, 26 . . . circumferential reinforcing bar, 27 . . . hairpin reinforcement 30 . . . lower side frame, 51 . . . primary concrete, 53 . . . template, 53a . . . positioning hole, 54 . . . foundation bolt, 55 . . . top reinforcement, 57 . . . anchor bolt unit, 58 . . . anchor plate, 61 . . . secondary concrete, 71 . . . ECCS pump, 74 . . . base part, 74a . . . installation hole, 75 . . . lower casing

What is claimed is:

1. An installation method of equipment, comprising:
   forming a pit container unit including a first frame, reinforcing steel members, a pit container, and an anchor member supporting mechanism, the forming including:
      disposing the first frame at a location different from an installation location of the equipment;
      disposing the reinforcing steel members proximate to the first frame to reinforce the first frame;
      placing the pit container on the first frame inside the reinforcing steel members;
      attaching an anchor member supporting mechanism to the pit container, the anchor member supporting mechanism including a supporting member to support a ring state anchor member positioned at an outer peripheral side of the pit container and a ring state reinforcing member having a center hole wherein a part of each reinforcing steel member is passed through a gap formed between the center hole and an outer peripheral portion of the pit container;
   placing a second frame on a base to be the installation location of the equipment;
   placing pit container unit on the second frame via the first frame;
   embedding a portion of the pit container unit and second frame not including the anchor member supporting mechanism, in concrete using a by primary concrete pour;
   disposing an anchor bolt unit including a plurality of foundation bolts for equipment installation fixed to the ring state anchor member, on the anchor member supporting mechanism after embedding the portion of the pit container unit by the primary concrete pour;
   correcting a positional relationship of the plurality of foundation bolts relative to the pit container by using a template member having a plurality of positioning holes into which the plurality of foundation bolts on the anchor bolt unit are individually inserted;
   embedding the pit container unit and the anchor bolt unit in concrete using a secondary concrete pour;

wherein the secondary concrete pour does not embed the template member in concrete, and wherein the positional relationship of an opening portion of the pit container and the plurality of foundation bolts is maintained by the template after the secondary concrete pour, removing the template;

moving the equipment into the pit container after removal of the template member; and fixing the equipment via the plurality of foundation bolts.

2. The installation method of equipment according to claim 1, wherein correcting the positional relationship of the pit container and the plurality of foundation bolts includes:

spot welding the supporting member to the anchor member after the position of the foundation bolts has been corrected to fall within a tolerance range by inserting the foundation bolts into the positioning holes of the template member.

3. The installation method of equipment according to claim 1, wherein the equipment is a vertical pump.

4. The installation method of equipment according to claim 2, wherein correcting the positional relationship of the pit container and the plurality of foundation bolts includes:

removing the template member and disposing additional reinforcing steel members to reinforce an upper side of the pit container unit after the supporting member and the anchor member are spot welded.

* * * * *